Oct. 2, 1951 W. E. LOONEY 2,569,685
AUTOMATIC TRANSMISSION
Filed April 7, 1948 3 Sheets-Sheet 1
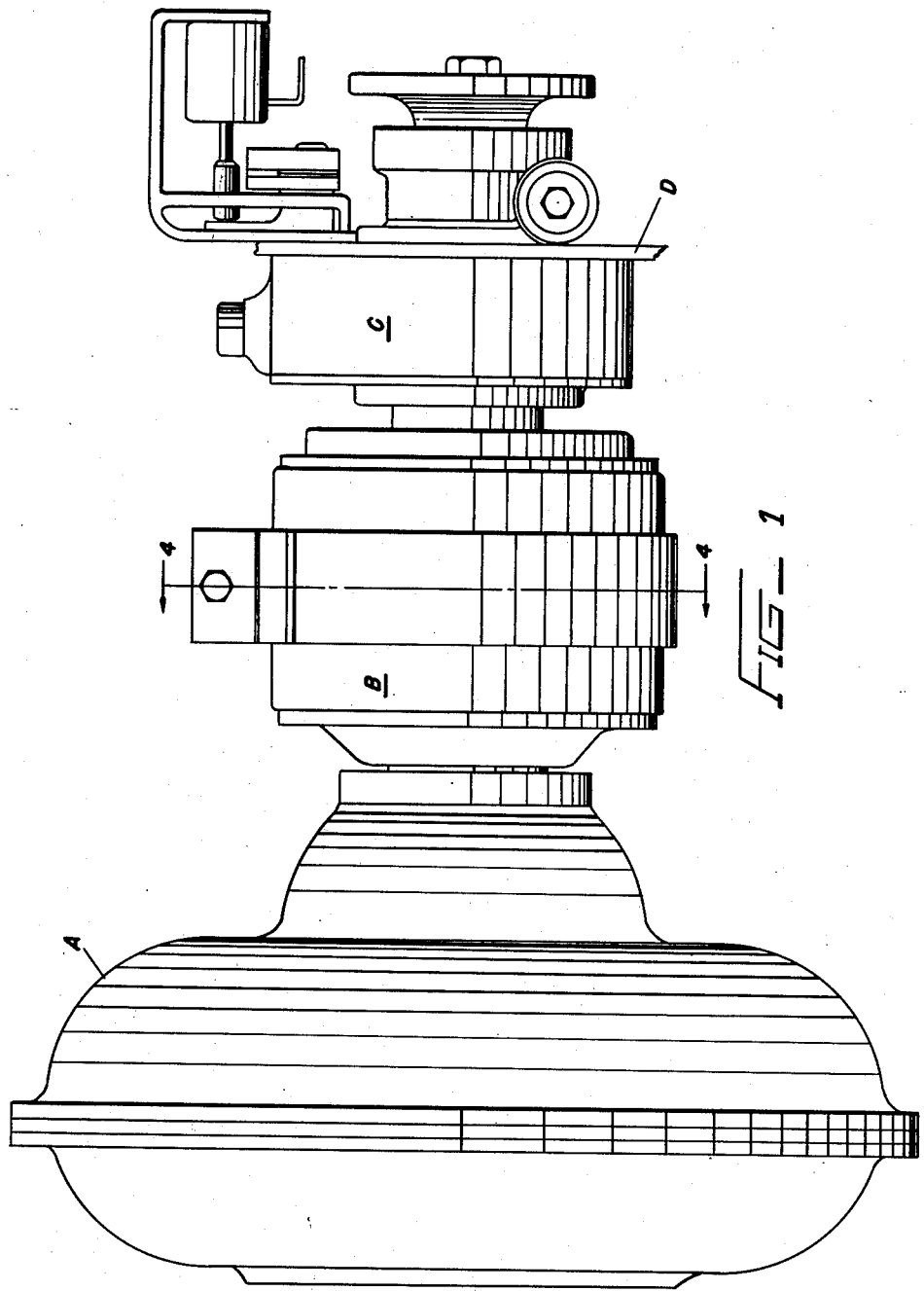
INVENTOR.
WILLIAM E. LOONEY
BY
Hauke & Hardesty
ATTORNEYS

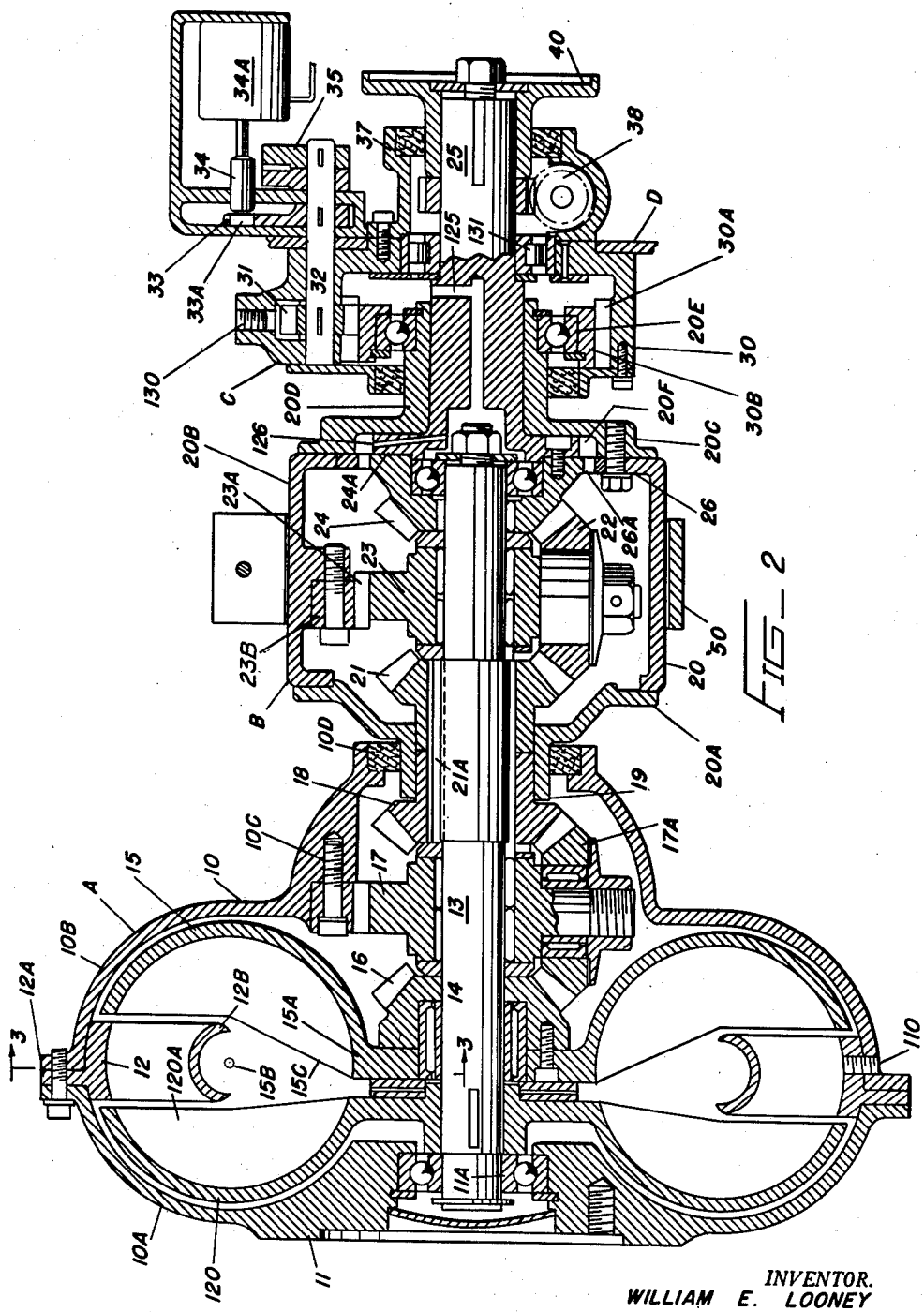

Oct. 2, 1951     W. E. LOONEY     2,569,685
AUTOMATIC TRANSMISSION
Filed April 7, 1948     3 Sheets-Sheet 3
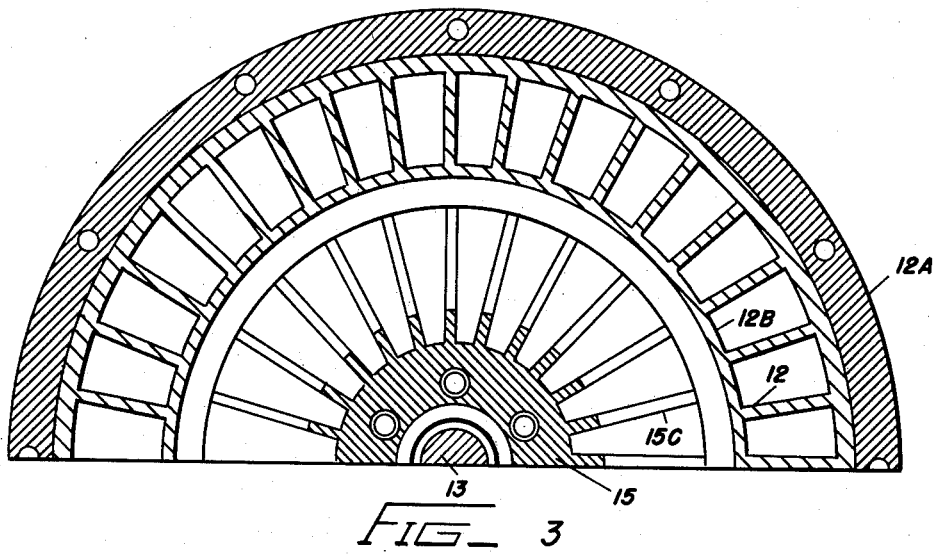
FIG_ 3
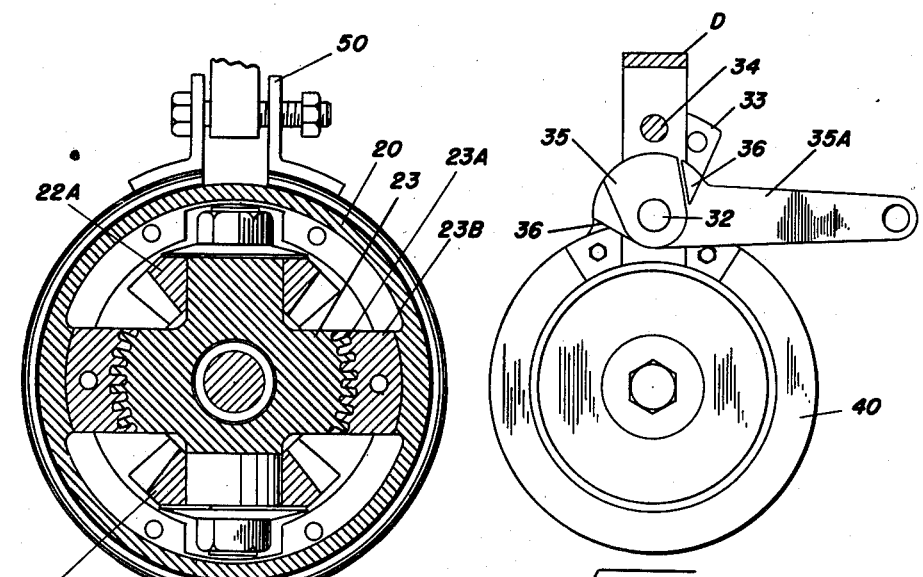
FIG_ 4     FIG_ 5
INVENTOR.
WILLIAM E. LOONEY
BY
ATTORNEYS.

Patented Oct. 2, 1951

2,569,685

UNITED STATES PATENT OFFICE 2,569,685

AUTOMATIC TRANSMISSION

William E. Looney, Detroit, Mich.

Application April 7, 1948, Serial No. 19,569

2 Claims. (Cl. 74—731)

The present invention relates to automatic transmissions intended specifically for automotive vehicles but applicable also to other uses.

Among the objects of the invention is to provide a fully automatic transmission in which the flow of driving power is uninterrupted in the transition from the lower to the higher speeds to direct drive condition.

Another object is to provide a transmission involving a fluid drive in which the fluid coupling element is more efficient than known forms of such fluid elements.

Still other objects and advantages will be apparent to those skilled in the art upon reference to the following description and the accompanying drawings in which Fig. 1 is an exterior view of the transmission.

Fig. 2 is a vertical central longitudinal sectional view of the device.

Fig. 3 is a section on line 3—3 of Fig. 2.

Fig. 4 is a section on line 4—4 of Fig. 1.

Fig. 5 is an end view from the right of Fig. 1, with parts in section and showing the hand controls.

In the drawings, the transmission is indicated as made up of three elements—the fluid drive unit A, the forward and reverse drive unit B, both rotatable, and the stationary control carrying unit C, the latter being mounted upon a suitable stationary part of the frame D, and the rotatable portions enclosed in a suitable overall housing (not shown).

Referring more particularly to Fig. 2 et seq., the unit A is shown in section and comprises a casing 10 attached in driven relation to a motor (not shown).

The casing is made up of two parts 10A and 10B bolted together with the flange 12A of an intermediate member 12 clamped therebetween, suitable gaskets being used to provide an oil tight joint.

The part 10A carries the face 11 and is axially bored and carries an anti-friction bearing 11A serving to pilot the end of shaft 13. The other portion 10B extends axially for a short distance and is rotatable upon a port'on of the unit B.

Mounted within casing 10 and freely rotatable on shaft 13, on the antifriction bearing 14, is a vaned driving element 15, this being fixed to a bevel gear 16 surrounding shaft 13. Carried within the axial extension of part 10B and fixed thereto as by screws 10C is a spider 17 carrying a plurality of bevel gears 17A meshing with gear 16.

Also meshing with gears 17A is another bevel gear 18 fixed on shaft 13 as by a key 13 and having its bearing in an extension 19 of the casing of unit B. Upon the outer surface of this extension is piloted the axially extended portion of part 10B of casing 10, a suitable barrier 10D of oil resistant resilient material being used to prevent oil leakage at this point. Also mounted within casing 10 is a vaned driven member 120 keyed to shaft 13, while between the driving and driven vaned members 15 and 120 is the intermediate vaned ring 12 fixed to the casing 10 in the manner already described.

The member 15 consists of a plate having a relatively small hub portion 15A surrounded by a portion curved on a rather large radius from a center 15B located in the center plane of the hub portion and in the curved portion a plurality of radial vanes 15C extending axially. These vanes are of an area somewhat less than the semicircle, being cut away to permit the use of the ring 12. The driven member 120 is of similar construction with vanes 120A of substantially the area of vanes 15C.

The intermediate member 12 consists of an outer ring, carrying the flange 12A, and an inner ring 12B having radially arranged vanes 12C therebetween. The inner ring 12B is preferably curved as shown on a small radius struck from center 15B so as to offer little interference to liquid flow.

When the parts 12, 15 and 120 are in assembled relation, a cross sectional view shows them as a substantially complete circular assembly.

As stated above, the hub of gear 18 extends into the axial extension 19 of the casing for unit B. This casing 20 is shown as consisting of an end plate 20A carrying the extension 19, a cylindrical main portion 20B and an end closure 20C. The shaft 13 extends into the casing 20 and has coaxial with gear 18 a similar bevel gear 21, the two gears being fixed together and to the shaft by a key or keys 21A.

This gear 21 meshes with the bevel gears 22 carried on a spider 23 and these in turn with a bevel gear 24 fixed to the flange 24A formed on the terminal shaft 25. Surrounding shaft 25 and flange 24A is the closure p'ate 20C for the casing 20. This plate has a cylindrical sleeve portion 20D serving as a bearing for the shaft 25 which portion is mounted in the anti-friction bearing 20E carried in the stationary unit C. This plate is also recessed as at 20F to receive the flange 24A the recess being somewhat larger in diameter than the flange to provide an oil passage as later described.

It should be noted that the gear 24 is fixed to the flanged end of shaft 25 and is freely rotatable about shaft 13, the end of the latter being piloted in the gear-shaft assembly.

The casing 20 at this end is provided with an inwardly extending flange 26 to which the plate 20C is fixed. And the edge of this flange is toothed, as at 26A, to provide one member of a dog clutch, the other member being teeth formed on the gear 24.

As stated above, the gears 22 and 22A are carried by a spider 23. This spider 23 is anchored indirectly to casing 20 through helical teeth 23A meshing with other teeth formed on suitable blocks 23B fixed to the interior periphery of the casing 20 (see Figs. 2, 4).

The unit C comprises a stationary housing 30 fixed to a suitable frame member D, and provided on its inner periphery with helical splines 30A. Coacting with the splines 30A is a splined ring 30B in which is mounted the bearing 20E for the sleeve 20D. These splines are helically arranged and at a suitable point about the periphery of ring 30B mesh with a helical gear 31 keyed upon a shaft 32 mounted in the upper portion of the housing 30. Also fixed to shaft 32 is a segment 33 having an opening 33A therein, which opening is adapted to receive the end of a plunger 34. Also keyed to shaft 32 is a short lever 35 in the form of a sector. Alongside of the lever 35 is a second longer lever 35A freely rotatable about the shaft 32 and carrying spaced abutments 36 adapted to determine the movement of lever 35 which is located between said abutments.

Suitable means for manual operation of lever 35A and for maintaining it in adjusted position will be provided but are not shown.

The terminal shaft 25 will extend through a suitable housing 37 and carry the conventional worm and worm gear 38 for speedometer operation and a suitable flange member 40 fixed to the power take-off end of the shaft.

In preparing the transmission for operation, a suitable oil is put into the housing 10 through the opening 110 provided for this purpose and normally plugged. Further, oil is put into the units B and C through a suitable opening 130 at the top of the latter. Since it is desirable to provide for some oil expansion and possible escape of gases, a suitable reservoir or standpipe (not shown) should be fixed over the opening 130. When the oil is put in the latter, it flows from the housing 30 through passages 131 into the housing 37 and through passage 125 in shaft 25 into the pilot bearing for shaft 13 and also through a passage 126 into recess 20F and from both the gearings and recess into the casing 20.

Further, the gears 18 and 21 may be internally grooved to provide for passage of oil between casings 10 and 20.

In connection with the operation of the device as about to be described, it should be noted that the helical teeth 23A, 26A and 30A are all so inclined that when the load resistance is such that torque is being transmitted from the motor fixed to face 11, the several parts tend to move into the positions shown in Fig. 2.

This means that when the reverse flow of power occurs, that is, when the load decreases and tries to operate the motor, the parts automatically move to disconnect the motor and load by moving the casing 20 to the right (Fig. 2) and disconnecting the dog clutch 26A.

With this in mind, and assuming the load (i. e. shaft 25 and flange 40) stationary, application of torque to casing 10 rotates the latter and, since the gear 18 is still, causes the vaned member 15 to turn at twice the speed of casing 10, while the intermediate member 12 of course rotates at casing speed. Both members move relatively to the vaned member 120.

When the torque on member 120 due to the action of the vanes on the fluid increases to the point where the member 120 begins to overcome load resistance, the shaft 13 begins to rotate and to transmit the motion through gears 18 and 21, spider 23, and clutch 26A to gear 24 and shaft 25.

So far, the operation of the device has been described as for transmission of torque to shaft 25.

If it is desired to idle the motor, operation of lever 35A will cause the movement of the ring 30B in unit C to the right (Fig. 2) and to carry with it sleeve 20D and casing 20 so as to release clutch 26A. This allows the casing 20 to turn freely about the gear 24.

Reverse drive is obtained by disconnecting clutch 26A in the manner described and applying a suitable brake 50 (see Fig. 1) to the casing 20 of unit B.

During the ordinary operation of the transmission when applied to an automobile, the clutch 26A will engage and disengage automatically from time to time due to acceleration and deceleration. Therefore, because it is desired sometimes to maintain the clutch in constant engagement or in constant disengagement, the lever 33 may be provided with two receiving holes 33A for plunger 34 and the solenoid 34A energized by means of a suitable switch conveniently placed to be accessible to the operator.

One of the main features of the present invention is the intermediate member 12 in the unit A. This member provides for a feed back of kinetic energy to the driving member 10 from the vaned member 15 and this increases the efficiency of the unit, particularly during the starting up time and until the member 120 reaches substantially the rotative speed of the casing 10.

I claim:

1. In an automatic transmission a fluid drive coupling having a power take-off shaft extending therefrom, a rotatable casing through which said shaft extends, a bevel gear differential in said casing and having its spider rotatable with said casing, a sun gear keyed to said shaft adjacent said coupling, a second sun gear rotatable about said shaft and provided with pilot means for the end of said shaft, a load shaft extension fixed to said second sun gear, clutch means between said second gear and said casing, means for engaging said clutch means with flow of power from said coupling toward said load shaft and for disengaging said clutch means upon reversal of said power flow, and manual means for controlling said engagement and disengagement.

2. In an automatic transmission a fluid drive coupling having a power take-off shaft extending therefrom, a rotatable casing through which said shaft extends, said casing being also movable longitudinally, a bevel gear differential in said casing and having its spider rotatable with said casing, a sun gear keyed to said shaft adjacent said coupling, a second sun gear rotatable about said shaft and provided with pilot means for the end of said shaft, a load shaft extension fixed to said second sun gear, clutch means between said second gear and said casing, and comprising interengaging teeth on said casing and second gear, and means for causing longitudinal movement of said casing and thereby engagement of said teeth upon application of power to the first sun gear and manual means for controlling said engagement and disengagement, said manual means consisting of a stationary casing provided in its inner periphery with helical splines, an extension on said rotary casing projecting into said stationary casing and carrying a ring rotatable upon said extension and provided with splines adapted to coact with the splines in said stationary casing, manually operable means for partially rotating said ring relative to the stationary casing and means for preventing relative longitudinal movement of said ring and extension.

WILLIAM E. LOONEY.

REFERENCES CITED

The following references are of record in the file of this patent:

UNITED STATES PATENTS

| Number | Name | Date |
| --- | --- | --- |
| 1,007,281 | Grutzner | Oct. 31, 1911 |
| 1,271,079 | Radcliffe | July 2, 1918 |
| 2,005,444 | Weiss | June 18 1935 |
| 2,055,895 | Fawcett | Sept. 29, 1936 |
| 2,118,464 | Fitzhugh | May 24, 1938 |
| 2,395,636 | Mettert | Feb. 26, 1946 |